(12) United States Patent
Gheorghita et al.

(10) Patent No.: US 11,461,563 B1
(45) Date of Patent: Oct. 4, 2022

(54) INSPECTION APPARATUS FOR OPTICAL INSPECTION OF A CARD INSERTION SLOT OF A CARD READER

(71) Applicant: INGENICO INC., Alpharetta, GA (US)

(72) Inventors: Silviu Gheorghita, Mississauga (CA); Ronan Lohéac, Cumming, GA (US)

(73) Assignee: INGENICO INC., Alpharetta, GA (US)

( * ) Notice: Subject to any disclaimer, the term of this patent is extended or adjusted under 35 U.S.C. 154(b) by 0 days.

(21) Appl. No.: 17/365,364

(22) Filed: Jul. 1, 2021

(51) Int. Cl.
*G06K 7/00* (2006.01)
*G06K 7/015* (2006.01)
*G06K 7/10* (2006.01)

(52) U.S. Cl.
CPC ........... *G06K 7/0069* (2013.01); *G06K 7/015* (2013.01); *G06K 7/10* (2013.01); *G06K 2007/10524* (2013.01)

(58) Field of Classification Search
CPC ........ G06K 7/0069; G06K 7/015; G06K 7/10; G06K 2007/10524
See application file for complete search history.

(56) References Cited

U.S. PATENT DOCUMENTS 9,217,870 B1* 12/2015 Marquette ............ G02B 27/025
2020/0106932 A1* 4/2020 Chou ................. G01N 21/8483

* cited by examiner

*Primary Examiner* — Tuyen K Vo
(74) *Attorney, Agent, or Firm* — David D. Brush; Westman, Champlin & Koehler, P.A.

(57) ABSTRACT

An inspection apparatus for optical inspection of a card insertion slot of a card reader. The apparatus includes a housing holding a magnifier lens assembly, the magnifier lens assembly being mounted through the housing, from a back face to a front face of the housing; at least two guiding elements, protruding outwards the front face of the housing; and at least two light sources located on a front side of the inspection apparatus. The inspection apparatus is further configured so that the at least two guiding elements, the at least two light sources, and an optical axis of the magnifier lens assembly are substantially contained in a same plane.

11 Claims, 8 Drawing Sheets

INSPECTION APPARATUS FOR OPTICAL INSPECTION OF A CARD INSERTION SLOT OF A CARD READER

FIELD OF THE DISCLOSURE

The present disclosure relates generally to the field of card readers. More particularly, the present disclosure relates to tools that can be used to inspect a card insertion slot of a card reader.

BACKGROUND

To accommodate the differences that may exist between various existing transaction card technologies, manufacturers provide different transaction card reading systems. Typically, a transaction card reading system includes at least one transaction card reader with a slot for inserting a transaction card, so as to make the system compatible with widely used contact smart card type transaction cards. To meet specific requirements, manufacturers can also offer hybrid readers. A hybrid reader is, like a hybrid transaction card, a reader that supports at least two different communication technologies. For example, a hybrid reader comprises means for reading a chip of a contact smart card and means for reading a magnetic stripe of a magnetic stripe card. For reasons of compactness and simplicity of use, a hybrid reader generally has only one insertion slot, which can be used either for the insertion of a contact smart card or a magnetic stripe card. Such a reader is in fact designed to recognize a contact smart card from a magnetic stripe card and to be able to switch to one or the other of these technologies depending on the transaction card inserted in the insertion slot. Card readers (hybrid or not) are widely integrated into automatic vending machines (such as gas station pumps) or in automatic teller machines (ATM).

Many of these automatic devices, also known as automatic kiosks, are accessible on a self-service basis, unattended, and/or installed in unprotected environments. For example, it is common for an automatic train ticket vending machine to be available on a station platform, outside, to allow a user to purchase a ticket even at late hours or in low-traffic stations without dedicated sales staff. The transaction card insertion slot (typically, the insertion slot into which a user inserts his or her payment card to purchase a good or service) is then typically a point of weakness in such an automatic device, as it forms an opening through which internal and potentially sensitive components of the reader (e.g., a smart card connector, a magnetic reading head, etc.) are accessible.

As a result, the card insertion slot of a card reader is regularly targeted by malicious people.

For example, as opportunistic vandalism, an individual may deliberately insert any object he has on hand, other than a transaction card (e.g. a coffee spoon or a subway ticket), in the card insertion slot. This may cause significant damage to the card reader, preventing it from operating properly. Since the card insertion slot is narrow and deep, the deteriorations resulting from such acts of vandalism are difficult to detect.

The card insertion slot may also be tampered in a context of fraud attempt. For example, hacking devices known as "skimmers" and "shimmers" may be mounted over or inside the card insertion slot, these devices being designed to read and fraudulently capture the confidential data of the transaction cards inserted in the reader, without the user being aware of them (either because they look like a legitimate part of the card reader sitting on top of the insertion slot, or because they are installed directly inside the narrow and deep insertion slot). Besides, such hacking devices often don't prevent the card reader from functioning properly, making them even harder to detect.

It would hence be desirable to provide a tool that facilitates visual inspection of the card insertion slot of a card reader, and more particularly of the inside of the insertion slot. Such an inspection tool would for example be useful for field technicians and repair facilities in charge of maintenance of card reading systems, for investigating the cause of a malfunctioning (that may result from normal wear and tear, or from internal intentional damages), or for detecting the possible presence of a hacking device within the card reader.

SUMMARY

According to the present disclosure, an inspection apparatus for optical inspection of a card insertion slot of a card reader is proposed. The inspection apparatus comprises a housing holding a magnifier lens assembly, the magnifier lens assembly being mounted through the housing, from a back face to a front face of the housing; at least two guiding elements, protruding outwards the front face of the housing; and at least two light sources located on a front side of the inspection apparatus. The inspection apparatus is further configured so that the at least two guiding elements, the at least two light sources, and an optical axis of the magnifier lens assembly are substantially contained in a same plane. The proposed technique thus makes it possible to provide illuminated and magnified view of the inside of the card insertion slot, i.e. optimal viewing conditions, by using the guiding elements as abutment elements or insertion elements to align both the light sources and the magnifier lens assembly along the insertion slot to inspect.

According to an embodiment, the light sources are located on a front side of the guiding elements.

According to another embodiment, the light sources are located under the guiding elements, at the front face level of the housing, and the guiding elements comprise light guides configured to transmit light from the light sources to a front side of the guiding elements.

According to a particular feature of this embodiment the guiding elements are made of light transmitting translucent plastic.

According to an embodiment, the apparatus comprises two guiding elements located on either side of the magnifier lens assembly and two light sources located on either side of the magnifier lens assembly.

According to an embodiment, the guiding elements have a thickness equal or lower than 1 millimeter.

According to an embodiment, both the guiding elements and the light sources have a thickness equal or lower than 1 millimeter.

According to an embodiment, the focal length of the magnifier lens assembly is comprised between 20 millimeters and 30 millimeters.

According to an embodiment, the apparatus further comprises at least one retaining element configured to retain a mobile device on the back face of the housing, in a position where a camera of the mobile device faces the magnifier lens assembly.

The present disclosure also relates to a system for optical inspection of a card insertion slot of a card reader, the system comprising an inspection apparatus for optical inspection of the card insertion slot of the card reader and a mobile device removably coupled to the inspection apparatus. According to the disclosure, the inspection apparatus of the system comprises a housing holding a magnifier lens assembly, the magnifier lens assembly being mounted through the housing, from a back face to a front face of the housing; at least two guiding elements, protruding outwards the front face of the housing; at least two light sources located on a front side of the apparatus; and at least one retaining element configured to retain a mobile device on the back face of the housing; the apparatus being further configured so that the at least two guiding elements, the at least two light sources, and an optical axis of the magnifier lens assembly are substantially contained in a same plane. The mobile device of the system is removably coupled to the back face of the housing of the inspection apparatus, by means of the at least one retaining element, so that a camera of the mobile device faces the magnifier lens assembly of the inspection apparatus.

The present disclosure also relates to a method for optical inspection of a card insertion slot of a card reader, the method comprising: align at least two light sources and magnifier lens assembly of an inspection apparatus coupled to a mobile device along the card insertion slot, by using guiding elements of the inspection apparatus; capture at least one image of an illuminated and magnified view of the inside of the card insertion slot, using a camera of the mobile device; analyze the at least of image locally on the mobile device and/or transmit the at least one image from the mobile device to a remote service for remote analysis; and obtain result of the analysis on the mobile device.

It is to be understood that both the foregoing general description and the following detailed description are exemplary and explanatory and are not restrictive of the disclosure, as claimed.

It must also be understood that references in the specification to "one embodiment" or "an embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

BRIEF DESCRIPTION OF THE DRAWINGS

Embodiments of the present disclosure can be better understood with reference to the following description and drawings, given by way of example and not limiting the scope of protection, and in which.

The components in the figures are not necessarily to scale, emphasis instead being placed upon illustrating the principles of the disclosure.

DETAILED DESCRIPTION

The present disclosure relates to an apparatus for optical inspection of a card insertion slot of a card reader. More particularly, such an inspection apparatus makes it possible to illuminate and magnify the inside of the card insertion slot. It may be used for example to detect possible deteriorations caused by the insertion of a foreign object other than a card in an insertion slot of a card reader, or to detect possible presence of a hacking device (e.g. skimmer, shimmer, etc.) installed by a malicious person over or within the insertion slot with the aim of stealing data from customers cards.

FIGS. 1 to 7 illustrate various embodiments of such an inspection apparatus 100. In all of these figures, like or similar elements are designated by a same numerical reference sign.

Figure 1:
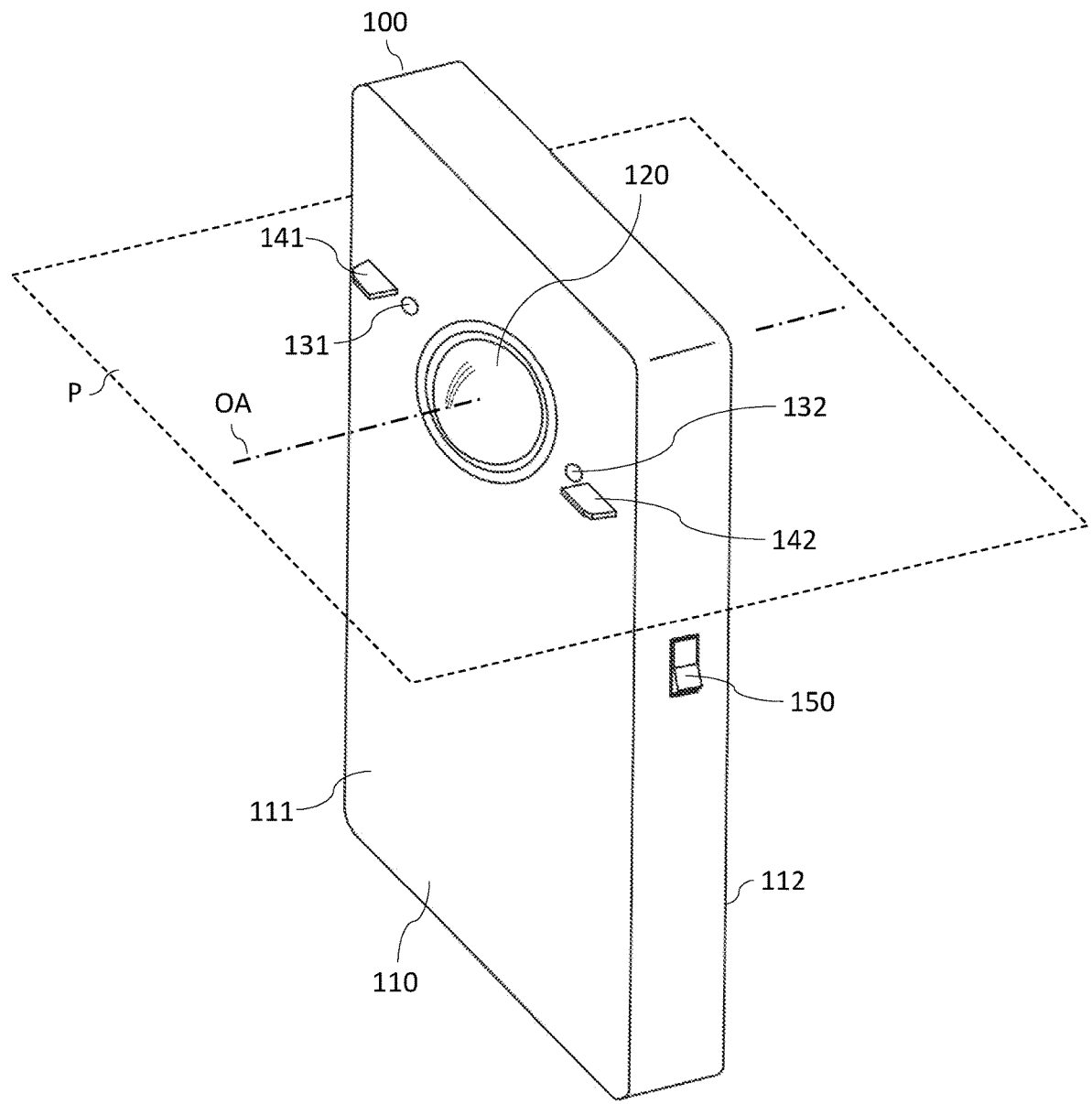
FIG. 1 illustrates a perspective view showing the front of an inspection apparatus, according to an embodiment of the disclosure.

According to the disclosure, and as shown on the example of FIG. 1, the inspection apparatus 100 comprises a housing 110 holding a magnifier lens assembly 120. The magnifier lens assembly 120 may be formed by a single magnifying lens or by a combination of several lenses.

More particularly, according to an embodiment, the housing 110 has a generally rectangular parallelepiped shape, with two main and opposite faces—a front face 111 and a back face 112—and the magnifier lens assembly 120 is mounted in a hole (typically a cylindrical hole) going through the housing 100, from the back face 112 to the front face 111. In the context of the disclosure, the back face 112 of the housing 110 defines an "ocular" face of the inspection apparatus 100, i.e. the face which is intended to be on the side of an observing eye (or, as it will be described later, of a camera of a mobile device). Conversely, the front face 111 of the housing 110 defines an "objective" face of the inspection apparatus 100, i.e. the face which is intended to be on the side of a card insertion slot to inspect.

The magnifier lens assembly 120 may be mounted in an upper part of the housing 110, so that a lower part of the housing 110 may be used as a gripping part enabling a user to hold the apparatus by hand.

According to the disclosure, the inspection apparatus 100 further comprises at least two light sources (131, 132) located on the front side of the apparatus (i.e. on the side corresponding to the front face 111 side of the apparatus). These light sources may be formed by light-emitting diodes (LED), such as super bright white light-emitting diodes for example.

The housing 110 may also embed an electrical source to power the light sources, an on/off button 150 to switch the light sources on or off, and associated circuitry. According to an embodiment, the electrical source may be a single PP3 nine-volt battery removably located within a battery compartment arranged within the housing 110. In that way, the inspection apparatus is portable and autonomous, making it particularly suitable for use in the field.

The inspection apparatus 100 also comprises at least two guiding elements (141, 142) protruding outwards the front face 111 of the housing 110. Such guiding elements (141, 142) are used as abutment elements or insertion elements to align both the light sources (131, 132) and the magnifier lens assembly 120 along a card insertion slot to inspect, as it will be described later in further details in relation with FIG. 4, in one embodiment of the disclosure.

To this end, according to the general principle of the disclosure, the guiding elements (141, 142) extends in a plane P containing the optical axis OA of the magnifier lens assembly 120 and the light sources (141, 142) (for the sake of simplicity, plane P and optical axis OA are represented only on FIG. 1). In an embodiment, such a plane P is substantially perpendicular to the front face 111 of the housing 110. In other words, if one looks at a front view of the inspection apparatus 100 (front view of the front face 111), the light sources (131, 132), the guiding elements (141, 142) and the center of the magnifier lens assembly 120 appear substantially aligned. According to a particular feature, the guiding elements can take the form of protruding tabs contained in plane P, the protruding tabs having a thickness equal or close to the thickness of a payment card as defined in the ISO/IEC 7810 ID-1 standard, i.e. 0.76 millimeters (the thickness being understood, in the context of the present disclosure, as the dimension along an axis normal to plane P). For example, the thickness of the protruding tabs may be equal or lower than 1 millimeter. Complementary, according to another particular feature, the distance between the farthest points of the farthest protruding tabs may not exceed the width of a payment card as defined in the ISO/IEC 7810 ID-1 standard, i.e. 53.98 millimeters. Such features regarding the position and the dimensions of the guiding elements ensure that they can all be inserted at the same time in the card insertion slot of a standard transaction card reader as embedded in most automatic devices (e.g. automatic vending machines, automatic teller machines, point-of-sales terminals, etc.).

Figure 2:
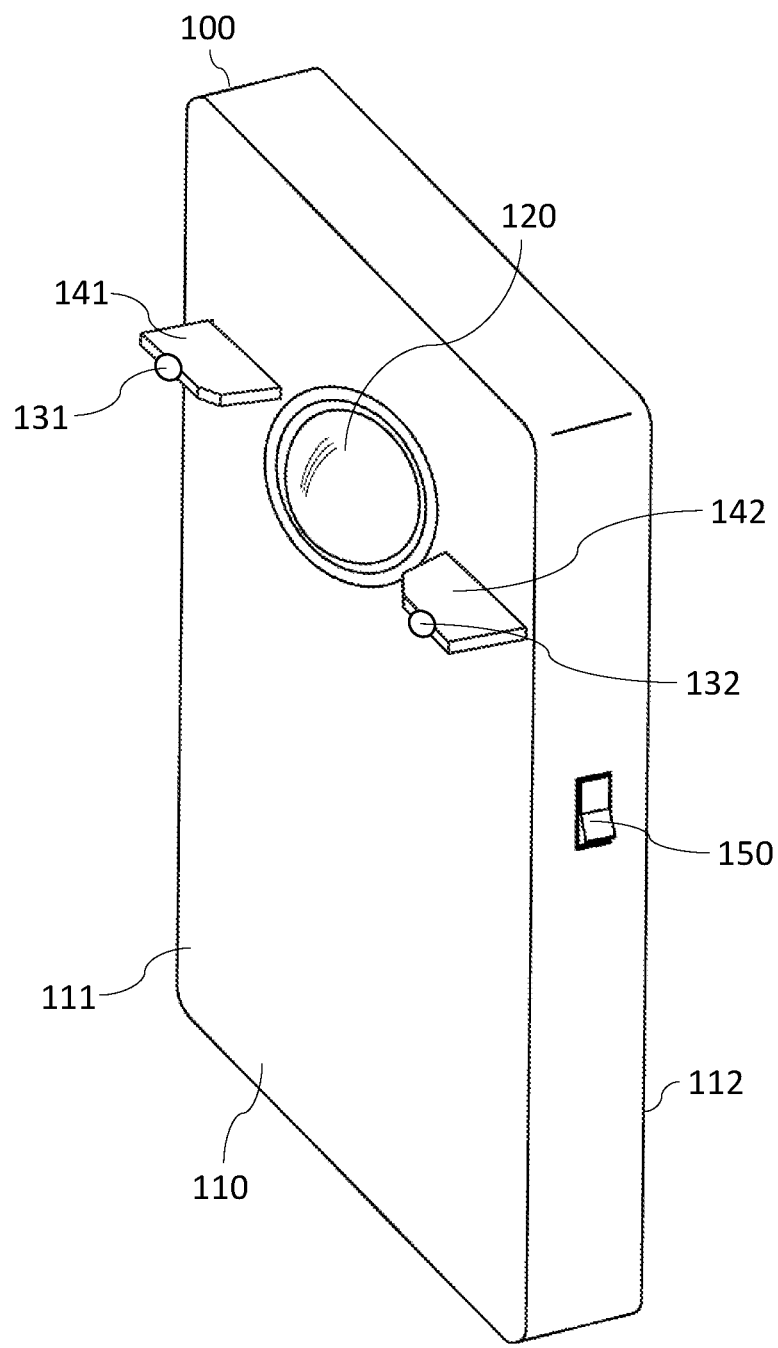
FIG. 2 illustrates a perspective view showing the front of an inspection apparatus, according to another embodiment of the disclosure.
Figure 3:
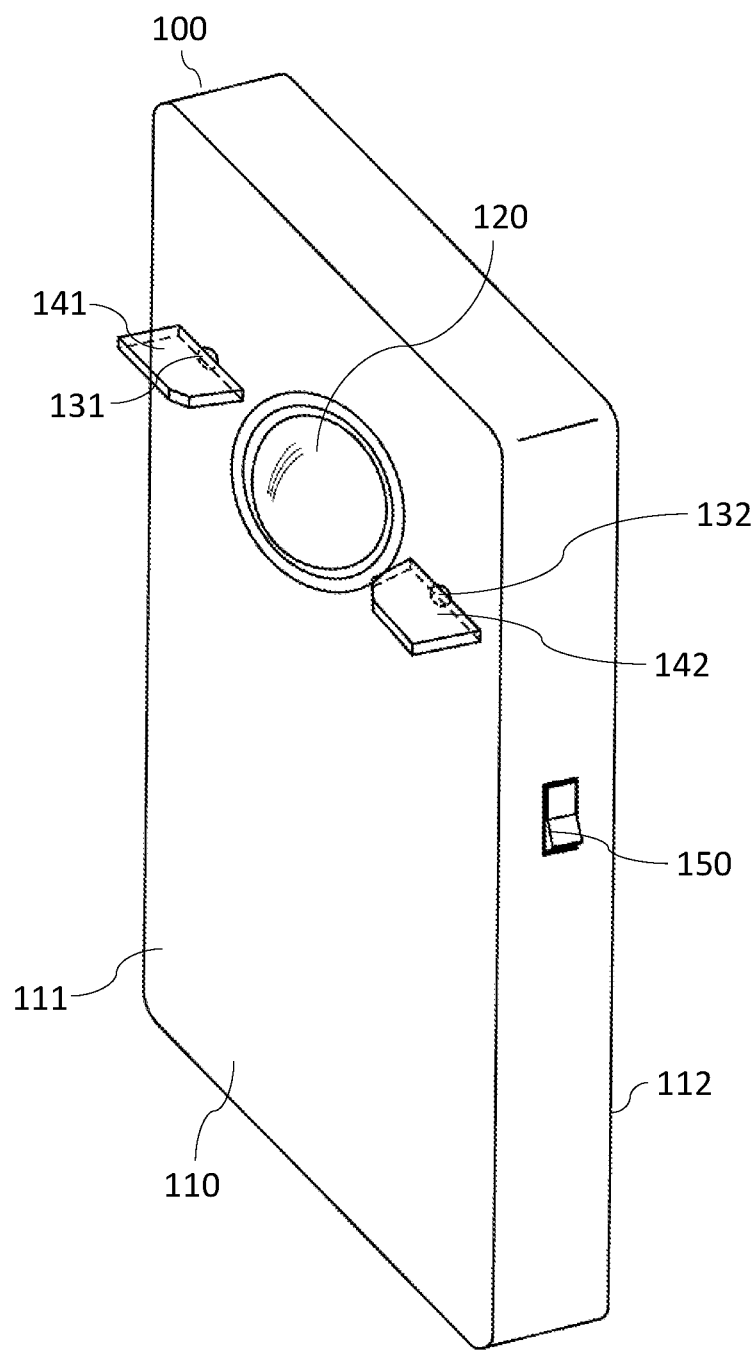
FIG. 3 illustrates a perspective view showing the front of an inspection apparatus, according to another embodiment of the disclosure.

FIGS. 1, 2 and 3 illustrate various embodiments of an inspection apparatus according to the proposed technique. In those exemplary embodiments, the inspection apparatus comprises two light sources (131, 132) and two guiding elements (141, 142). For better stability and optimal lightning conditions, the two light sources (131, 132) and the two guiding elements (141, 142) are arranged either side of the magnifier lens assembly 120 (one light source and one guiding element on the left side of the magnifier lens assembly, one light source and one guiding element on the right side of the magnifier lens assembly). The shape (including for example beveled or curved parts), the dimensions, and the positions of the two protruding guiding elements are configured so that these elements don't fall in the field of view of a user looking through the magnifier lens assembly from the ocular face 112. FIGS. 1, 2 and 3 more particularly describe various embodiments regarding respective positions of the light sources and guiding elements.

According to the embodiment depicted on FIG. 1, the guiding elements and the light sources are separated elements, with no interaction (i.e. physical contact) with each other. In such an embodiment, the light sources 131 and 132 are located at the front face 111 level of the housing. For example, they may be mounted directly on the front face 111 (i.e. outside the housing 110), or, alternatively, just beneath the front face 111 (i.e. inside the housing 110) with corresponding holes in the front face 111 allowing the light to pass through. The guiding elements 141 and 142 may be made of plastic, and may be either directly molded in the housing or affixed to the front face of the housing. The inspection apparatus according to the exemplary embodiment of FIG. 1 has thus a simple and robust design.

According to another embodiment depicted on FIG. 2, the light sources 131 and 132 are mounted directly on the guiding elements 141 and 142, for example on a front side or a front extremity of the guiding elements. According to a particular feature, light sources and guiding elements are both thin enough (e.g. they have a thickness equal or lower than 1 millimeter) so that the light sources may get inserted in the slot, when inspecting a card insertion slot. Compared with the embodiment described in relation with FIG. 1, such an embodiment has the advantages of providing better lightning conditions, since the light sources are closer to—or even inside—the card insertion slot to inspect.

According to another embodiment depicted on FIG. 3, the light sources are mounted in a similar way than the one already described in relation with FIG. 1 (i.e. they are located at the front face level, either mounted directly on the front face 111, outside the housing 110, or just beneath the front face 111, inside the housing 110, with corresponding holes in the front face 111 allowing the light to pass through). However, the guiding elements 141 and 142 are now made from light-transmitting translucent plastic, and they are affixed to the front face 111 of the housing so that each guiding element covers a different one of the light sources. For example, in the exemplary embodiment shown in FIG. 3, guiding element 141 is mounted above light source 131, and guiding element 142 is mounted above light source 132. In such an embodiment, the guiding elements are not only useful for alignment of the light sources and of the magnifier lens assembly along a card-opening edge of a card reader, but they also act as light guides guiding the light from the light sources towards or within the card insertion slot to inspect. In this respect, the shape of the guiding elements may be designed so as to provide uniform lighting of the inside of the card insertion slot, by including beveled or curved parts for example. The embodiment illustrated in relation with FIG. 3 thus combines the benefits of both the embodiments of FIGS. 1 and 2, i.e. a simple and robust inspection apparatus providing optimal lightning conditions.

Figure 4:
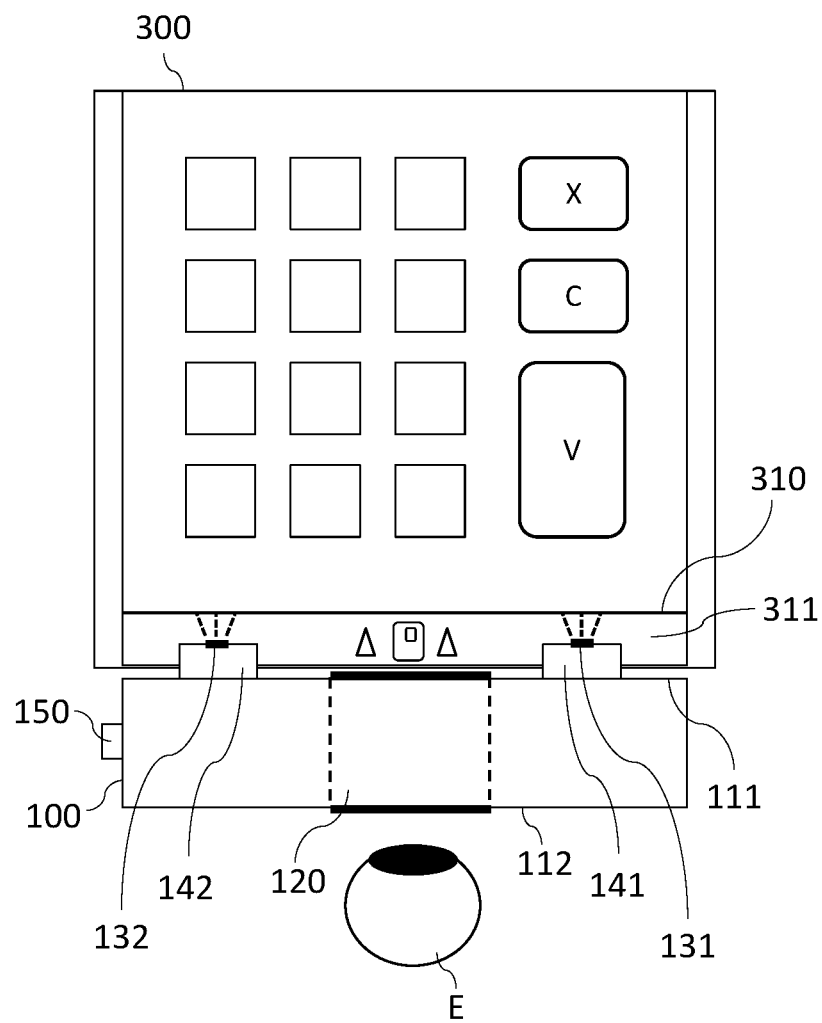
FIG. 4 illustrates, in a schematic view from above, how an inspection apparatus is used to inspect the card insertion slot of a card reader, according to an embodiment of the disclosure.

Now referring to FIG. 4, a view from above of an inspection apparatus in use for the inspection of a card insertion slot is presented, according to an embodiment of the disclosure. When a user wants to inspect the card insertion slot 310 of a card reader 300 (only partially represented on FIG. 4), he places the inspection apparatus 100 so that both guiding elements 141 and 142 either abut an edge 311 of the card insertion slot 310 (as shown in FIG. 4), or engage within the card insertion slot 310 (depending on the embodiment of the inspection apparatus used and/or on the shape of the opening of the insertion slot). Switched on (for example by means of on/off button 150), the light sources 131 and 132 then illuminate the inside of the insertion slot. Looking with his eye E through the magnifier lens assembly 120 from the ocular face 112 of the inspection apparatus, the user sees an illuminated and magnified view of the inside of the insertion slot. The guiding elements 141 and 142 ensure that the light sources and the magnifier lens assembly are perfectly aligned along the card insertion slot, but also allow stabilizing the whole inspection apparatus 100 on the card reader 300, thus helping to provide a steady view. As a result, the user can inspect with very good conditions the inside of the card insertion slot and the component thereon, including for example sensitive components such as a smart card connector and/or a magnetic reading head.

According to an embodiment, the magnifier lens assembly 120 is designed so as to form an optical system having a focal length comprised between 20 millimeters and 30 millimeters (e.g. 25 millimeters). Such a focal length is interesting in that it provides a sharp view on the smart card connector pins of the inspected card insertion slot, thus making it possible, for example, to determine a wear status of the smart card connector, or to easily detect the presence of a hacking device (e.g. a skimmer or a shimmer) inside the smart card connector. According to a particular feature, the inspection apparatus 100 comprises means (not represented) to adjust the focal length of the magnifier lens assembly 120, thus allowing the user to focus at will on various zones of the inside of the inspected card insertion slot.

Figure 5:
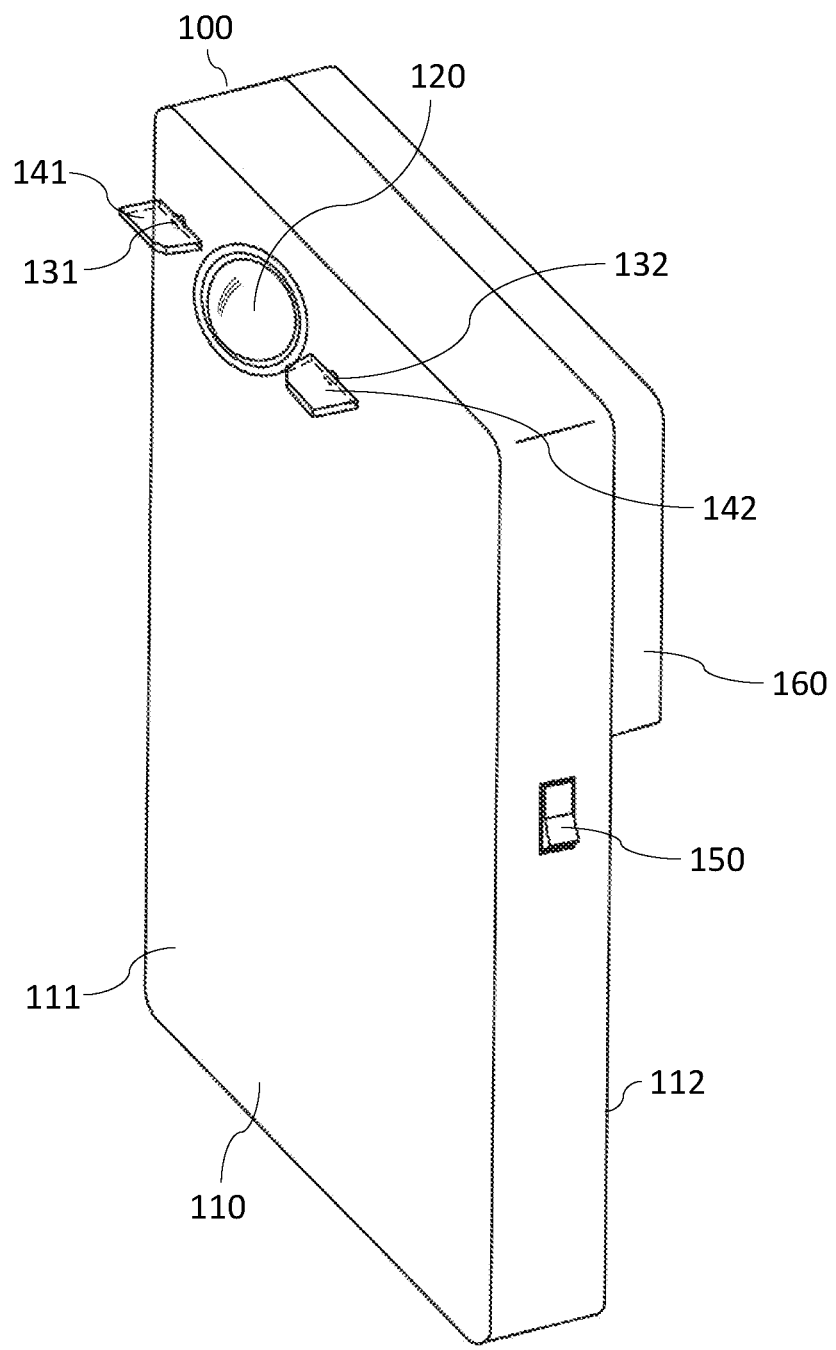
FIG. 5 illustrates a perspective view showing the front of an inspection apparatus couplable to a mobile device, according to an embodiment of the disclosure.
Figure 6:
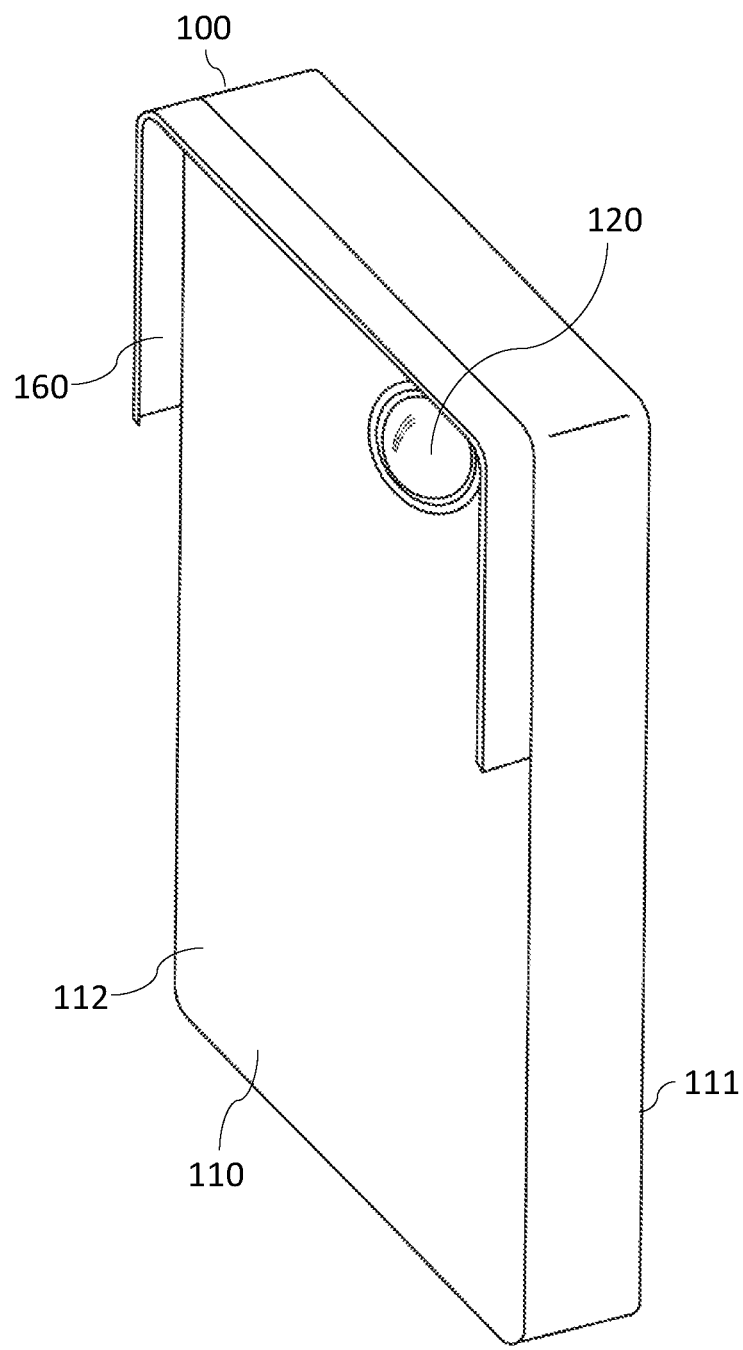
FIG. 6 illustrates a perspective view showing the back of an inspection apparatus couplable to a mobile device, according to an embodiment of the disclosure.
Figure 7:
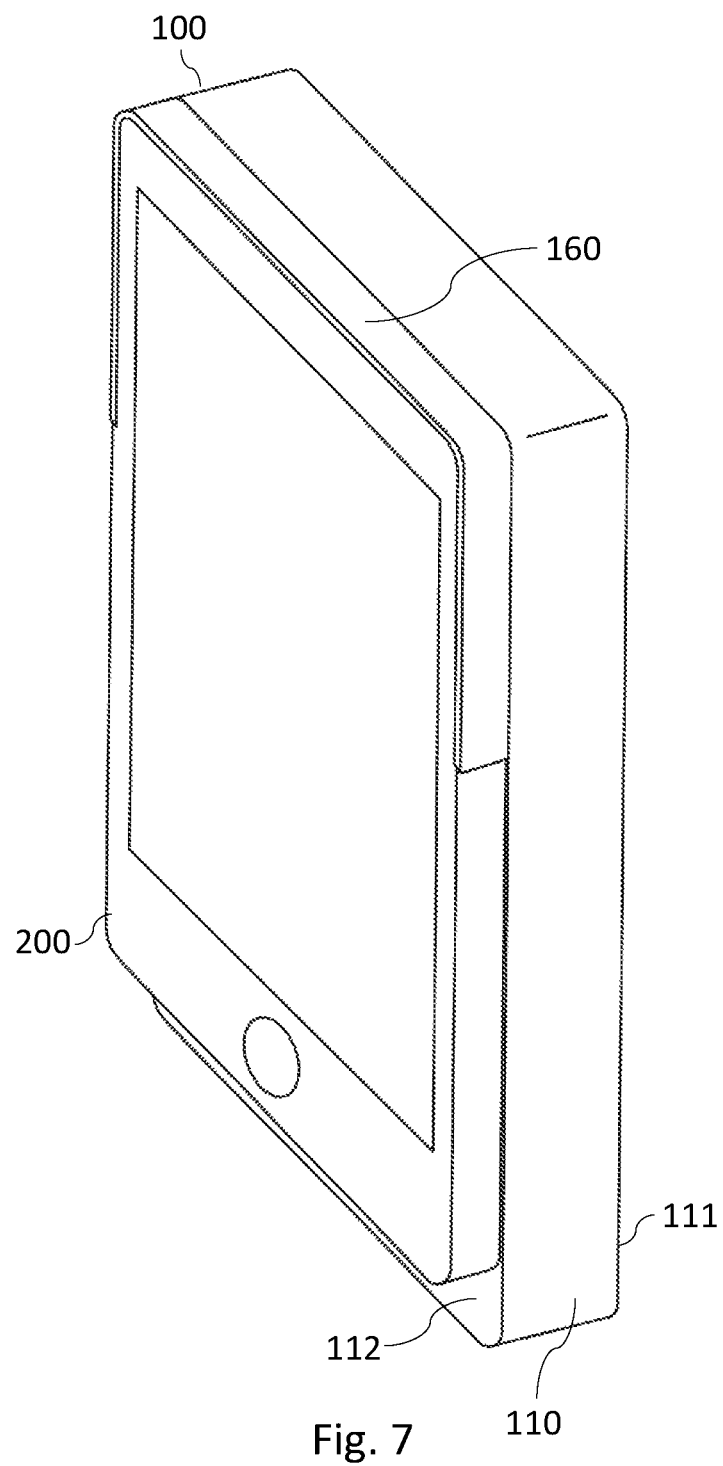
FIG. 7 illustrates a perspective view of an inspection apparatus coupled to a mobile device, according to an embodiment of the disclosure.

According to other embodiments, illustrated in relation with FIGS. 5, 6 and 7, the inspection apparatus 100 may be removably coupled to a mobile device comprising a camera. In that way, the user has the possibility to take some pictures of the inside of a card insertion slot. The mobile device may be a smartphone or a tablet for example. In such embodiments, the back face 112 of the inspection apparatus 100 acts as a surface to receive the mobile device: it is on this face that the back of the mobile device 200 rests (at least partially) when it is coupled to the inspection apparatus. To this end, the housing 110 comprises at least one retaining element (which may also be referred to as a holding element). In the particular embodiment of the inspection apparatus presented with reference to FIGS. 5 to 7, the retaining element takes the form of a groove 160 extending at least partially on three sides of the housing 110. The mobile device can for example be inserted within the groove 160 through a motion of translation, from the free side of the housing (i.e. the side with no groove). Once fully inserted into the groove 160, as shown on FIG. 7, the inspection apparatus 100 and the mobile device 200 form together a portable and autonomous system for optical inspection of the card insertion slot, making it possible to acquire images of the inside of the insertion slot. More particularly, the inspection apparatus 100 is designed so that, when coupled to the mobile device 200, the magnifier lens assembly 120 is located in front of the camera lens of the mobile device 200. For example, as illustrated in FIG. 5, the position of the magnifier lens assembly 120 and the size of the housing 110 and associated retaining means may be specifically adapted so as to ensure compatibility with a given set of predetermined mobile devices models. Of course, other retaining element than one or several grooves may be used to hold and couple the mobile device to the inspection apparatus. It should also be noted that an inspection apparatus as previously described in relation with FIGS. 5 and 6—i.e. comprising at least one retaining element configured to hold a mobile device—remains fully usable for human eye visual inspection of a card insertion slot (e.g. as previously described in relation with FIG. 4) even when no mobile device is coupled to the inspection apparatus.

According to an embodiment, the capabilities of the mobile device are exploited for further analysis of the images of the inside of a card insertion slot acquired by the system formed by the mobile device coupled to the inspection apparatus. Such an analysis may indeed be useful in many situations. For example, the inside of a card insertion slot may differ significantly between card readers models and/or brands, and field technicians using the inspection tool according to the proposed technique may not be trained to have expertise on every card reader they are likely to inspect. Furthermore, they are many different kinds of hacking devices, with hacking technologies evolving rapidly, and even a trained field technician may sometimes not be able to detect with certainty whether or not a skimmer or a shimmer is mounted over or inside an inspected card insertion slot.

Figure 8:
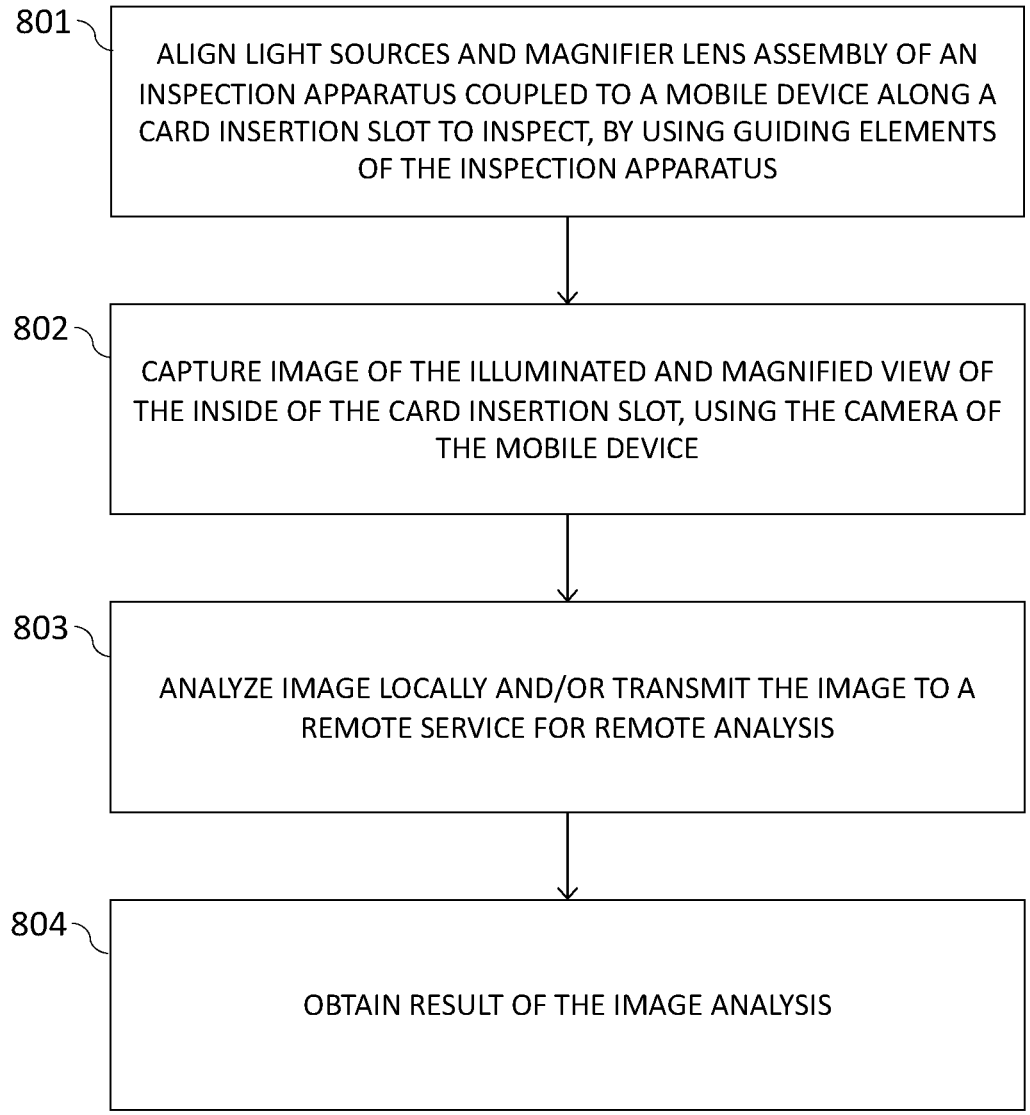
FIG. 8 is a flow chart for illustrating a method for inspecting a card insertion slot of a card reader with an inspection apparatus coupled to a mobile device, according to an embodiment of the disclosure.

According to another aspect of the present disclosure, it is thus proposed a method for optical inspection of a card insertion slot of a card reader, by using a system formed by a mobile device coupled to an inspection apparatus as previously described. Such a method is presented in relation with FIG. 8, in an embodiment. First, the guiding elements of the inspection apparatus are used to align the light sources and the magnifier lens assembly of the inspection apparatus along the card insertion slot to inspect (step 801). The camera of the mobile device is then used to capture, through the magnifier lens assembly of the inspection apparatus, at least one image of the illuminated and magnified inside of the card insertion slot (step 802). The mobile device is a smart device (typically a smartphone) which comprises—in addition to a camera—computation means such as one or several processors, storing means in the form of one or more memories, and communications means including various communication interfaces (3G, 4G, 5G, WiFi, Bluetooth, etc.) allowing the mobile device to communicate with a remote service through a communication network (e.g. Internet).

According to a particular feature, the communication means of the mobile device are used to transmit the insertion slot images to a support desk (step 803), where one or more experts can review and analyze the received images and provide real-time feedback to the field technicians (step 804) (e.g. by providing diagnosis regarding the wear status of the smart card connector, the presence of a hacking device, etc.).

Alternatively, or complementary, the insertion slot images may go through an automatic analysis process performed either locally by the computation means of the mobile device or remotely by a dedicated server (step 803). In the latter case, the communication means of the mobile device are used to transmit the insertion slot images to the remote server via a communication network such as the Internet, and to receive the result of the remote analysis from the remote server (step 804). Such an automatic analysis process may be performed by machine learning algorithms relying for example on the implementation of one or several neural networks configured to perform specific applications, such as for example detecting the presence of a hacking device (skimmer or shimmer) within the card insertion slot, estimating a degree of wear, etc. To this end, the neural networks may have been trained using some training dataset beforehand. Of course, any new image acquired from the proposed inspection system may eventually be added to the training dataset or to a knowledge database (e.g. an image bank), once it has been reviewed by an expert or when the result of an automatic analysis of the image has been acknowledged. In that way, the accuracy of future analysis may be improved, regardless of whether they are implemented manually by a skilled person or automatically by a server.

According to an embodiment, the above described features provided by the mobile device (e.g. capturing a picture of the insertion slot, launching a local automatic analysis of the picture, or sending it to a support desk and/or to a remote server for analysis, receiving a result of a remote analysis, etc.) are accessible through a dedicated native or web application running on the mobile device.

While the disclosure has been described with reference to exemplary embodiments, it is to be understood that the disclosure can be embodied in various forms, and is not to be limited to the examples discussed above. For example, instead of protruding tabs, the guiding elements may take the form of simple rigid steel wires (with light sources possibly attached at the end of the steel wires). Besides, other solutions different from the one illustrated on FIG. 3, but relying too on the use of light guides, may be implemented in the context of the proposed technique. For example, the guiding elements may not be fully made from translucent plastic, but may instead embed at least one light guide element (such as a piece of optical fiber for example) for guiding the light from the light source to the front of the guiding element, among other light-non-transmitting parts. Furthermore, while mainly described in the context of the inspection of a card insertion slot of a transaction card reader, it is also to be understood that the use of the inspection apparatus according to the proposed technique is not limited to this specific kind of card reader.

The invention claimed is:

1. An inspection apparatus for optical inspection of a card insertion slot of a card reader, wherein the apparatus comprises:
    a housing holding a magnifier lens assembly, the magnifier lens assembly being mounted through the housing, from a back face to a front face of the housing;
    at least two guiding elements, protruding outwards the front face of the housing; and
    at least two light sources located on a front side of the inspection apparatus;
the inspection apparatus being configured so that the at least two guiding elements, the at least two light sources, and an optical axis of the magnifier lens assembly are substantially contained in a same plane.

2. The apparatus according to claim 1, wherein the at least two light sources are located on a front side of the at least two guiding elements.

3. The apparatus according to claim 1, wherein the at least two light sources are located under the at least two guiding elements, at the front face level of the housing, and wherein the at least two guiding elements comprise light guides configured to transmit light from the at least two light sources to a front side of the at least two guiding elements.

4. The apparatus according to claim 3, wherein the at least two guiding elements are made of light transmitting translucent plastic.

5. The apparatus according to claim 1, wherein the apparatus comprises two guiding elements located on either side of the magnifier lens assembly and two light sources located on either side of the magnifier lens assembly.

6. The apparatus according to claim 1, wherein the at least two guiding elements have a thickness equal or lower than 1 millimeter.

7. The apparatus according to claim 2, wherein the at least two guiding elements and the at least two light sources have a thickness equal or lower than 1 millimeter.

8. The apparatus according to claim 1, wherein the focal length of the magnifier lens assembly is comprised between 20 millimeters and 30 millimeters.

9. The apparatus according to claim 1, wherein the apparatus further comprises at least one retaining element configured to retain a mobile device on the back face of the housing, in a position where a camera of the mobile device faces the magnifier lens assembly.

10. A system for optical inspection of a card insertion slot of a card reader, the system comprising:
    an inspection apparatus for optical inspection of the card insertion slot of the card reader, the apparatus comprising:
        a housing holding a magnifier lens assembly, the magnifier lens assembly being mounted through the housing, from a back face to a front face of the housing;
        at least two guiding elements, protruding outwards the front face of the housing;
        at least two light sources located on a front side of the apparatus; and
        at least one retaining element configured to retain a mobile device on the back face of the housing;
    the apparatus being configured so that the at least two guiding elements, the at least two light sources, and an optical axis of the magnifier lens assembly are substantially contained in a same plane; and
    the mobile device, which is removably coupled to the back face of the housing of said apparatus, by means of said at least one retaining element, so that a camera of the mobile device faces the magnifier lens assembly of the inspection apparatus.

11. A method for optical inspection of a card insertion slot of a card reader, the method comprising:
    align at least two light sources and a magnifier lens assembly of an inspection apparatus coupled to a mobile device along the card insertion slot, by using guiding elements of the inspection apparatus;
    capture at least one image of an illuminated and magnified view of the inside of the card insertion slot, using a camera of the mobile device;
    analyze the at least one image locally on the mobile device and/or transmit the at least one image from the mobile device to a remote service for remote analysis; and
    obtain result of the analysis on the mobile device.

* * * * *